3,726,825
POLYURETHANE COATING FOR MOISTURE
VAPOR BARRIER
Fred E. Woodward, West Palm Beach, Fla., Dora A. Krasner, Yonkers, N.Y., and Sherman Krefting, Teaneck, N.J., assignors to Diamond Shamrock Corporation, Cleveland, Ohio
No Drawing. Continuation-in-part of application Ser. No. 669,253, Sept. 20, 1967. This application Mar. 15, 1971, Ser. No. 124,491
Int. Cl. C08g 22/06; C08j 1/42; B32b 27/10
U.S. Cl. 260—29.2 TN                16 Claims

ABSTRACT OF THE DISCLOSURE

Compositions of cured linear thermoplastic polyurethane resins are used as coatings to form moisture vapor barriers or permeable materials. The polyurethane resins are reactive products of certain non-halogenated organic diisocyanates, neopentyl glycol and organic dihydroxy compounds other than neopentyl glycol, such as polyethers having two hydroxyl groups and dihydric compounds having only carbon to carbon bonds in the backbone and having from two to twenty carbon atoms. The resin compositions can be applied as lacquers or as emulsions.

---

This is a continuation-in-part of co-pending application Ser. No. 669,253, filed Sept. 20, 1967, now abandoned.

BACKGROUND OF THE INVENTION

This invention relates to cured linear thermoplastic polyurethane resin coating compositions and their use as moisture vapor barriers when applied as coatings on permeable materials. The cured resins are reaction products of certain non-halogenated organic diisocyanates, neopentyl glycol and organic dihydroxy compounds such as polyethers having two terminal hydroxyl groups and having an average molecular weight of from about 300 to about 3,000 and/or dihydric compounds, other than neopentyl glycol, having only carbon to carbon bonds in the backbone and having from two to twenty carbon atoms.

It is well known that coating compositions can be used to form moisture vapor barriers on permeable materials so that these permeable materials are useful as packaging to protect products from water vapor or other degradative agents present in the product or in the atmosphere surrounding the packaged product. For example, coating compositions have been used to form moisture vapor barriers on permeable materials such as paper, paperboard, plastic films or the like so these permeable materials can be used as wrappings, containers or the like to protect products such as foodstuffs, industrial products and other articles of commerce from these degradative agents.

Common coating compositions employed for permeable materials are usually blends of polyvinylidene chloride, nitrocellulose and paraffin waxes. However, these compositions have numerous disadvantages. For example, coatings formed from these compositions are often very brittle and are not durable. Furthermore, the coatings lack abrasion resistance, gloss, heat sealability and the like. Moreover, it is usually necessary to use additives to improve the low temperature flexibility and durability properties of the coatings. Although additives may improve these properties, they can adversely affect other desirable properties of the coatings. Furthermore, additives can produce odors which are highly objectionable when the coated material is used as a package, wrapper or container for foodstuffs and other odor sensitive materials.

Furthermore, coatings prepared from compositions containing blends and additives often have poor solvent resistance and components of the composition are selectively removed by vapors or solvents present either in the packaged material or in contact with the outer surface of the packaged material. Coatings prepared from compositions containing blends and additives can also have poor sunlight stability and can discolor or lose their barrier properties on exposure to sunlight.

SUMMARY OF THE INVENTION

It is an object of the present invention to provide new cured thermoplastic polyurethane resin coating compositions for use or permeable materials. Another object is to provide coatings which act as moisture vapor barriers. A further object is to provide coating compositions which produce coatings having desirable properties such as high gloss, abrasion resistance, high tensile strength, low temperature flexibility, water resistance, solvent resistance, have low coefficients of friction, and are heat sealable, nonblocking, odorless, colorless, light stable and the like when applied to provide processes using these coating compositions. Still another object is to provide treated materials coated with these compositions which have greatly improved properties for use as packaging for foodstuffs, industrial products and the like. Other objects of this invention will become apparent from the detailed description given hereinafter. It is intended, however, the detailed descriptions and specific examples do not limit this invention but merely indicate preferred embodiments thereof since various changes and modifications within the scope of this invention will become apparent to those skilled in the art.

The above as well as other objects of this invention have been achieved in the following manner. We have discovered a new class of cured thermoplastic resin coating compositions which are useful for treating permeable materials such as paper, paperboard, plastic films and other materials used as packages, wrappers or containers for foodstuffs, industrial products and the like. Furthermore, we have discovered that coatings produced by these compositions exhibit unexpected moisture vapor barrier properties and form highly effective moisture vapor barriers when applied to permeable materials. The coatings also have the desirable coating properties mentioned above when they are applied to permeable materials.

Heretofore, polyurethane resins have been used as coatings in many applications because they formed glossy, scuff resistant and abrasion resistant surfaces, having outstanding resistance to attack by liquid water, solvents, chemical agents and the like. That is, they have been widely recognized as excellent coatings and have been used on a wide variety of porous and nonporous substrates and as self-supporting films. However, for many applications where transport or diffusion of moisture vapor through the film or coated substrate is undesirable, polyurethane resins heretofore have been completely non-applicable. This is because polyurethane resins are permeable to moisture vapor, and, therefore, do not provide a coating or a film which can prevent the penetration or permeability of moisture vapor. For example, "Modern Plastics Encyclopedia" vol. 41, No. 1A September 1963, p. 18, reports a value of 26 g./sq. meter/24 hr. as the moisture vapor transmission rate (MVTR) for an elastomeric polyurethane resin. This rate is many times greater than the rate for polymers normally used as moisture vapor barriers in packaging applications. This high moisture vapor transmission rate is characteristic of polyurethane resins of the prior art. Likewise, polyurethane resins curing via moisture reactions, classified as type II by ASTM D-1, SUB IX, Group 12, have been found to have similar high moisture vapor transmission rates.

DESCRIPTION OF THE PREFERRED EMBODIMENTS

Our new class of coating compositions containing cured linear thermoplastic polyurethane resins are reaction products of about one mole of a non-halogenated organic diisocyanate, about 0.1 mole to about 0.9 mole of neopentyl glycol and about 0.9 mole to about 0.1 mole of an organic dihydroxy compound such as a polyether having two terminal hydroxyl groups and having an average molecular weight of from about 300 to 3000 or a dihydric compound, other than neopentyl glycol, having only carbon to carbon bonds in the backbone and having from two to twenty carbon atoms with the proviso that the NCO/OH ratio of the resin is substantially 1.00/1.00. The compositions, if desired, can contain a volatile, inert organic solvent. These cured linear thermoplastic polyurethane resins are obtained by reacting the abovementioned proportions of organic diisocyanate, neopentyl glycol and organic dihydroxy compound under anhydrous conditions and under an anhydrous inert gas at about 50° C. to about 100° C. If desired, solvents and/or catalysts can be employed in the polymerization reaction.

The resins are cured during the polymerization, that is, the diisocyanate is substantially completely reacted with the neopentyl glycol and organic dihydroxy compounds. The resulting resins do not contain reactive isocyanate groups, that is, the NCO/OH ratio of the cured polymer is about 1.00/1.00. Consequently, coating compositions containing the resins do not require curing either before or after application to permeable materials.

The compositions are usually applied directly to the permeable material. When the composition contains a volatile inert solvent, the composition is coated on the permeable material and the coated material is dried to remove any solvent remaining on the material. The resins are readily soluble in ketones and solutions of the resins dissolved in volatile ketones such as methyl ethyl ketone are particularly suitable in preparing lacquers for use as coating compositions.

Methods of application for the resins and their lacquers on permeable materials are well known in the coating art. As examples of methods of application which can be used, there may be mentioned fluidized bed methods followed by heating, spray methods such as hot spray, solvent spray and the like, coating methods such as applications by knife blades, air blades, roller coatings, gravure coatings, by dipping permeable materials into a solution of the polymer, by impregnating the permeable material with a solution of the polymer and the like.

When polyurethane resin compositions are employed in the absence of solvents, further treatment of the permeable material is usually not required. The solvent free resin compositions can be applied by the fluidized bed method if they are in solid form or by the roller coating method if they are in liquid form. When the permeable material is treated with resin compositions containing volatile solvents, the treated permeable material is usually dried at room temperature or higher temperatures to volatilize and remove the solvent. The solvent containing compositions can be applied by the knife blade method, spray methods and the like. Since the resins are completely cured and do not undergo further reaction, it is usually not necessary to employ elevated temperatures except when heat is required to facilitate the removal of volatile solvents. When desired, elevated temperatures can be used with solvent free compositions to melt solid solvent free compositions and to reduce the viscosity of liquid solvent free compositions.

Permeable materials treated with the resin compositions of the present invention have numerous advantages not found in the coating compositions employed by the prior art. For example, the resin compositions produce coatings on permeable materials which have the highly desirable coating properties described above in the objects. These properties of the resin compositions make them particularly suitable as coatings for permeable materials used as packages for foodstuffs, industrial products and the like. Since these types of packages are subject to flexing, abrasion and other destructive forces during their manufacture and use, the properties of these resin compositions are particularly suitable for use as coatings on permeable materials for packages. Since moisture and other components present in foodstuffs and industrial products often have adverse effects on the coatings of packages, the excellent water resistance and solvent resistance of the resin compositions of the present invention are highly advantageous. Likewise, the water resistance and solvent resistance of these coatings are particularly advantageous when packages coated with these compositions are exposed to external sources of moisture and/or solvents. Furthermore, the coatings serve as moisture vapor barriers to prevent transmission of moisture as well as other undesirable vapors, degradative agents, solvents and the like through permeable materials. The coatings greatly improve the resistance of the permeable material to withstand these degradative and destructive forces.

Compositions containing these cured linear thermoplastic polyurethane resins are applied to permeable materials employed as packaging, wrappers, containers and the like for foodstuffs, industrial products and other articles for commerce. Suitable permeable materials include paper, paperboard, plastic film and the like. Paper and paperboards include kraft, glassine, opaque sulfite pouch, bleached sulfate paper, bleached kraft, white glassine, sugar bag paper and the like. As examples of plastic film, there may be mentioned polyethylene, polypropylene, cellophane, polyvinyl chloride films and the like.

The cured polyurethane resins are prepared by reacting about 1.0 mole of a non-halogenated diisocyanate, about 0.1 mole to about 0.9 mole of neopentyl glycol and about 0.9 mole to about 0.1 mole of an organic dihydroxy compound such as a polyether having an average molecular weight of from about 300 to about 3000 or a dihydric compound, other than neopentyl glycol, having only carbon to carbon bonds in the backbone and having from two to twenty carbon atoms, with the proviso that the NCO/OH ratio of reactants used in the preparation of the resin is substantially 1.00/1.00. Further, cured polyurethane resins can be prepared by reacting about 1.00 mole of an organic diisocyanate, about 0.10 mole to about 0.75 mole of neopentyl glycol and about 0.90 mole to about 0.25 mole of an organic dihydroxy compound having the properties described above with the proviso that the NCO/OH ratio of reactants is substantially 1.00/1.00. Specific examples of polyurethane resins include the cured resin obtained by reaction of 1.00 mole of tolylene diisocyanate, 0.25 mole of a polyoxypropylene glycol having an average molecular weight of about 400 and 0.75 mole of neopentyl glycol, and the cured resin obtained by reaction of 1.00 mole of tolylene diisocyanate, 0.25 mole of a polyoxypropylene glycol having an average molecular weight of about 400, 0.50 mole of 1,4-butanediol and 0.25 mole of neopentyl glycol.

Cured polyurethane resins can be prepared by simultaneous reaction of the organic diisocyanate, neopentyl, glycol and organic dihydroxy compound in the abovementioned proportions. When desired, mixtures of one or more diisocyanates, polyethers and dihydric compounds can be used in combination with the neopentyl glycol. These mixtures include a mixture of polyether and dihydric compounds as well as mixtures of two or more polyethers and dihydric compounds when these mixtures are used in conjunction with neopentyl glycol.

These polyurethane resins can also be prepared by the prepolymer technique. That is, a stoichiometric excess of organic diisocyanate is first reacted with neopentyl glycol, polyether or dihydric compound other than neopentyl glycol or mixtures thereof to obtain a reaction product having reactive isocyanate groups which is called a prepolymer. Prepolymers are often used in place of organic diisocyanates because they are less volatile, less toxic and less reactive than organic diisocyanates. The reactive isocyanate groups present in the prepolymer are capable of further reaction with additional neopentyl glycol, polyether or dihydric compounds other than neopentyl glycol or mixtures thereof. For example, a stoichiometric excess of organic diisocyanate can be reacted with polyether to form a prepolymer which is then reacted with neopentyl glycol to obtain the desired resin. Likewise, a stoichiometric excess of organic diisocyanate can be reacted with neopentyl glycol to otbain a prepolymer which is then reacted with polyether to obtain the desired resin. When an organic isocyanate is reacted with polyether to obtain a prepolymer and the resulting prepolymer is then reacted with neopentyl glycol, neopentyl glycol acts as a chain extender. That is, the neopentyl glycol reacts with two moles of prepolymer thereby extending the chain and forming the desired resin. Mixtures of prepolymers can be used. For example, a prepolymer prepared by reacting organic diisocyanate and polyether is mixed with a second prepolymer prepared by reacting a second organic diisocyanate and neopentyl glycol. The prepolymer mixture can then be reacted with neopentyl glycol, polyether or a dihydric compound other than neopentyl glycol to obtain the desired resin. Likewise, a prepolymer obtained from a polyether and an organic diisocyanate can be chain extended with a mixture of neopentyl glyol and further organic diisocyanate to obtain the desired resin. The above procedures illustrate several methods of preparing polyurethane resins useful in the present invention. These procedures should not be regarded as limiting because suitable resins can be prepared by a variety of other known methods.

The above prepolymers are prepared by reacting a stoichiometric excess of organic diisocyanate with neopentyl glycol, polyether, a dihydric compound other than neopentyl glycol, or mixtures thereof under anhydrous conditions at about 50° C. to about 100° C. The prepolymer reaction must be carried out under anhydrous conditions so that the organic diisocyanate reacts with the hydroxyl groups of the other reactants and not with moisture in the air.

All reactants employed in the prepolymer preparation are therefore anhydrous and the preparation is usually carried out in the presence of an anhydrous inert atmosphere such as an anhydrous nitrogen blanket. If desired, the organic diisocyanate may be added to the neopentyl glycol and organic dihydroxy compound in two or more stages. That is, the initial reaction of the hydroxy containing compound with diisocyanate is carried out in the presence of the hydroxy containing compound. When this initial reaction is completed, additional organic diisocyanate is then added to provide an excess of diisocyanate and this quantity is reacted with the hydroxy terminated reaction product to obtain a prepolymer. This procedure is known as capping with diisocyanate. When desired, a volatile solvent which is inert to the reactive isocyanate groups present in the isocyanate and prepolymer can be used in the prepolymer preparation.

The cured polyurethane resins are then prepared by reacting the prepolymer containing reactive isocyanate groups with neopentyl glycol or organic dihydroxy compound or mixtures thereof in the abovementioned proportions. The reaction products have an NCO/OH ratio of substantially 1.00/1.00, that is, all reactive isocyanate groups in the prepolymer are reacted with hydroxyl groups and the resulting resin does not contain reactive isocyanate groups. Thus, these resins are cured polymers which are not capable of further reaction with hydroxy terminated compounds. Reaction of the prepolymer with hydroxy terminated compound is carried out by reacting the reactants at about 50° C. to about 100° C. under an anhydrous inert atmosphere and under anhydrous conditions. Reaction within this temperature range is continued until the resulting resin contains less than about 0.2% by weight of reactive isocyanate groups. The resin is then stabilized. That is, an alcohol such as isopropanol is added and reacted with the small percentage of residual reactive isocyanate groups remaining in the resin. The stabilized polymer is then cooled, filtered and stored under nitrogen. When desired, the polymerization may be carried out in the presence of an inert solvent which does not react with the reactive isocyanate groups.

Non-halogenated organic diisocyanates useful in preparing prepolymers and polyurethane resins of the types described above include: tolylene-2,4-diisocyanate, tolylene-2,6-diisocyanate, tolylene diisocyanate (65% 2,4; 35% 2,6), tolylene diisocyanate (80% 2.4; 20% 2,6), hexamethylene diisocyanate (HDI), 1,4-tetramethylenediisocyanate, 1,10-decamethylenediisocyanate, 4,4'-xylylene diisocyanate (XDI), 4,4'-methylene-bis (cyclohexane isocyanate), DDI which is a diisocyanate derived from dimer acids containing 36 carbon atoms and manubactured by General Mills, and the like. Inasmuch as linear polyurethane resins are desired, polyisocyanates containing more than two reactive isocyanate groups are not utilized. Mixtures of two or more of the abovementioned diisocyanates may be used.

Halogenated organic diisocyanates were found to be not useful in preparing the formulations of this invention. Phenyl substituted oragnic diisocyanates were found to be of only limited usefulness in the formulations of this invention due to their poor solubility.

Polyethers employed in the present invention include linear polyethers having an average molecular weight of from about 300 to about 3000 and having two terminal hydroxyl groups, that is, the polyether is terminated with two hydroxyl groups. Processes for producing these polyethers are well known in the art. The polyethers may be homopolymers, copolymers or terpolymers of an alkylene oxide polymer such as ethylene oxide, propylene oxide, butylene oxide, styrene oxide and the like. Such polymers may be the products of sequential additions and reactions of two more of the abovementioned alkylene oxides. Likewise, such polyethers may be prepared by reaction of mixture of two or more of the abovementioned alkylene oxides. If desired, sequential additions and reactions of mixtures of two or more of these alkylene oxides may be employed. These additions and reactions are carried out until a polyether having an average molecular weight of from about 300 to about 3000 is obtained. For example, an ethylene oxide adduct can be prepared by reaction of ten moles of ethylene oxide with one mole of water to obtain a polyether having an average molecular weight of about 458. Propylene oxide can be condensed with this polyether to obtain a polyether having an average molecular weight of about 1000. Likewise, a mixture of ten moles of ethylene oxide and ten moles of propylene oxide can be condensed with one mole of water to obtain a polyether having an average molecular weight of about 1138. Likewise, a polyether can be prepared by reacting two moles of ethylene oxide with one mole of water followed by reaction of ten moles of butylene oxide.

The polyethers can also be prepared by reacting at least one of these alkylene oxides with a dihydric compound having from two to twenty carbon atoms and two reactive hydroxyl groups. These dihydric compounds include ethylene glycol, propylene glycols, butylene glycols, hexylene glycols, octylene glycols, decylene glycols, dodecylene glycols, octadecylene glycols, eicosylene glycols and the like, polyglycols such as diethylene glycol, tripropylene glycol, their mixtures and the like. The abovementioned dihydric compounds include specific compounds as well as mixtures. For example, butylene glycols include 1,2-butylene glycol, 1,3-butylene glycol, 2,3-butylene glycol and 1,4-butylene glycol and their mixtures. Other glycols include 1,6-hexanediol, 2,5-hexanediol, dimethyl hexanediol and the like. Unsaturated glycols such as 2-butene-1,4-diol, 2-butyne-1,4-diol, dimethyl hexynediol, dimethyl octynediol and the like can also be used to produce polyethers. Polyethers include the propylene oxide adduct of diethylene glycol having a molecular weight of 300, the ethylene oxide adduct of tripropylene glycol having a molecular weight of 900, the butylene oxide adduct of hexylene glycol having a molecular weight of 700, the ethylene oxide adduct of 1,4-butylene glycol having a molecular weight of 1500, the propylene oxide adduct of 2-butyne-1,4-diol and the like. Other useful polyethers include polyoxyethylene glycols having molecular weights of 300, 400, 1540 and 2000; 410, 710, 1025 and 2010; polyoxytetramethylene glycols having molecular weights of 300, 400 and 2000; polyoxyhexamethylene glycols of molecule weights of 400 and 2000; polyoxyoctamethylene glycol having a molecular weight of 800; polyoxynonamethylene glycol having a molecular weight of 1000; polyoxydecamethylene glycol having a molecular weight of 400; polyoxydodecamethylene glycol having a molecular weight of 700 and mixtures thereof. Polyalkylene glycols containing several different radicals in the molecular chain such as, for example, compounds of the formula:

$$HO(CH_2OC_2H_4O)_nH$$

wherein $n$ is a positive integer sufficient to give a molecular weight of 300 to 3000. For example, polyacetals having hydroxyl groups and molecular weights of about 300 or more can be prepared from an aldehyde and an alcohol such as when formaldehyde and ethylene glycol are reacted. Other dihydroxy compounds can be reacted with the above 1,2-alkylene oxide. Such compounds include resorcinols, 3-hydroxy-2-naphthol and the like. Mixtures of two or more of the abovementioned types of polyethers can be employed.

Dihydric compounds used in the present invention are those compounds having only carbon to carbon bonds in the backbone, having two terminal reactive hydroxyl groups and having from two to twenty carbon atoms. Neopentyl glycol, being unique in the role it plays in this invention is not classified as one of the optional dihydric compounds used herein. Optional dihydric compounds include ethylene glycol, propylene glycols, butylene glycols, hexylene glycols, octylene glycols, decylene glycols, dodecylene glycols, tetradecylene glycols, octadecylene glycols, eicosylene glycols and the like. These dihydric compounds include specific compounds as well as mixtures. For example, butylene glycols include 1,2-butylene glycol, 1,3-butylene glycol, 2,3-butylene glycol, 1,4-butylene glycol and mixtures thereof. Other glycols include 1,6-hexanediol, 2,5-hexanediol, dimethyl hexanediol and the like. These dihydric compounds also include unsaturated isomers of the above compounds such as 2-butene-1,4-diol, 2-butyne-1,4-diol, dimethyl hexynediol, dimethyl octynediol and the like.

Neopentyl glycol is a required ingredient in the polyurethane resins disclosed in this invention. It has the chemical formula of 2,2-dimethyl-1,3-propanediol.

Examples of useful prepolymers include the reaction product of one mole of a polyether which is a polypropylene glycol having an average molecular weight of 400 and two moles of tolylene diisocyanate, the reaction product of one mole of 1,4-butanediol and two moles of tolylene diisocyanate, the reaction product of one mole of neopentyl glycol and two moles of tolylene diisocyanate, the reaction product of one mole of a polypropylene glycol having an average molecular weight of 1025 and two moles of tolylene diisocyanate and the like. Other prepolymers include the reaction product of two moles of 4,4'-methylene bis (cyclohexane isocyanate) and one mole of a polyoxyethylene glycol having a molecular weight of about 300, the reaction product of one mole of polyoxypropylene glycol having an average molecular weight of 3000 and two moles of tolylene diisocyanate and the like. The ratio of isocyanate groups in the diisocyanate to hydroxy groups in the neopentyl glycol or dihydric compounds which are used in the preparation of the prepolymer can vary from about 1.1:1 to about 2:1.

When desired, catalysts can be employed in the preparation of the cured linear thermoplastic polyurethane resins. They are used to facilitate prepolymer formation and/or polymerization reaction so that these reactions can be carried out at lower temperatures, shorter time periods or under other advantageous reaction conditions. As examples of catalysts useful in prepolymer preparations, there may be mentioned tertiary amines such as triethylenediamine, alkyl diamethyl amines and the like, metal salts such as tin carboxylates, dialkyl tin carboxylates, alkyl tin chlorides, ferric acetonylacetone, alkali metal carboxylates and the like. As examples of catalysts useful in the preparation of cured thermoplastic polyurethane resins, there may be mentioned tertiary amines such as triethylenediamine, alkyl dimethyl amines and the like, metal salts such as tin carboxylates (stannous octoate), dibutyl tin carboxylates, alkyl tin chlorides, ferric acetonylacetone, alkali metal carboxylates such as sodium oleate and the like.

Volatile inert organic solvents are used in anhydrous form in the preparation of the prepolymers and resins. Useful solvents have atmospheric boiling points from about 50° C. to about 200° C. so they can be easily removed from permeable materials by vaporization at room temperature or elevated temperatures.

Suitable inert solvents include ketones, esters, ethers, ether-esters, hydrocarbons, chlorinated hydrocarbons, alkyl sulfoxides and like solvents which do not contain active hydrogen atoms or other groups that are reactive with isocyanate groups. Specific examples include methyl ethyl ketone, methyl isobutyl ketone, ethyl acetate, butyl acetate, Cellosolve acetate (ethoxyethyl acetate), Carbitol acetate (ethoxyethoxyethyl acetate), chloroform, chlorobenzene, toluene, xylene dimethyl formamide, dimethyl sulfoxide, tetrahydrofuran and the like as well as their mixtures.

When these solvents are used in prepolymer and/or resin preparation, from about 0.1 parts by weight to about 1,000 parts by weight of the solvent per 100 parts by weight of the cured polyurethane resin can be used. When these solvents are used in coating compositions from about 0.1 part by weight to about 1,000 parts by weight of the solvent per 100 parts by weight of the cured polyurethane resin can be used. After essentially all isocyanate groups have been reacted and the resin is cured, solvents containing active hydrogen such as alcohols or the like, may be used in the solvent component of the composition.

The linear polyurethane resins disclosed in the present invention can be dissolved in lacquer solvents to obtain compositions which are useful as lacquers. Lacquer solvents which can be used to dissolve the resins include both one-type solvents and two-type solvents. Useful one-type solvents include alcohols, e.g., ethanol; ethers, e.g., diethyl ether; ketones, e.g., methyl ethyl ketone and esters, e.g., isopropyl acetate. Useful two-type solvents include mixtures of two or more of the one-type compounds or a single compound containing two or more of the characteristic groups present in the one-type compounds. Single compounds of the two-type compounds include alcohol-esters, e.g., ethyl glycollate; alcohol-ethers, e.g., diethylglycerol; alcohol-ketones, e.g., diacetone alcohol; ketone-esters, e.g., ethyl pyruvate; ketone ethers, e.g., ethoxy acetone and ester-ethers, e.g., ethoxy ethyl lactate. Compositions in the form of polyurethane resin lacquers can be applied to permeable materials by the procedures described previously to obtain treated permeable material useful as packages for commercial articles. Since the resins are cured, no further processing of the treated permeable material is required other than drying to remove volatile solvents. The unique polymeric structures of these resins make for ease in their formulation and use as lacquers. The resins do not require addition of special formulating additives such as defoamers, bodying agents, levelling agents or the like that were often required in the coating compositions previously used.

Furthermore, these coating compositions require no curing and only require evaporation of any solvent which may be present. Heat can be applied to effect evaporation but is not essential or required. The coated substrates or films possess the required low temperature flexibility without loss of barrier properties which makes then useful for packaging products to be stored at low temperatures.

Furthermore, these coated substrates or films are nonblocking when contacted coated side with coated side or coated side with uncoated side. This is an essential property of useful coatings for packaging materials to maintain their integrity and performance properties under all conditions encountered in packaging uses. A condition of blocking does not permit contact of a coated surface with another coated porous or nonporous surface without disruption, tear, loss of cohesion of polymer structure or the like. These desirable nonblocking properties are also characterized by a low cohesion of friction between the coated substrate or film when it is moved across a polished metal surface or other similarly coated substrate or film.

Furthermore, we have found that the coated substrate or film has the essential, required and desired property of heat sealability. This is the useful property of being able to seal two layers of a coated substrate or film where at least one of the surfaces contacted is coated with the novel compositions of this invention by applying heat and pressure for brief periods of time. As a result, at the point line or area of contact, a permanently sealed composition is formed and a permanent seal or bond results. Attempts to separate or delaminate this seal by mechanical means or force results in film to fiber rupture or substrate rupture requiring considerable mechanical effort. The polyurethane resin compositions disclosed in this invention provide all of the necessary, required and desired properties for coated substrates or films while at the same time providing the highly desirable moisture vapor barrier properties not previously obtained with any of the known polyurethane resin compositions.

The properties of the compositions are evaluated both as coatings on the permeable material and as free films. The following tests are employed to evaluate dried coatings or solvent free coatings after they have been applied to suitable test materials. The Moisture Vapor Transmission Rate (MVTR) of coatings on permeable materials is determined by the TAPPI T-448-M-9 Test. This test measures the grams of water transmitted through one square meter of the coated material per 24 hours and is a very useful test for determining the effectiveness of coatings as moisture vapor barriers. In commercial practice a moisture vapor transmission rate (MVTR) of less than 15 g./sq. meter/24 hours is essential for useful coating applications and compoistions producing MVTR values of 15 g./sq. meter/24 hr. or greater are considered unsatisfactory. This criterion or standard is used for characterizing acceptability of the polyurethane resin compositions as coatings. The hardness of coatings is determined by the pencil hardness test. The gloss value of the coating is determined by Gardner Glossmeter at a 60° angle. Solvent resistance of coatings is determined by exposure of the coating to solvents such as water, chlorinated solvents, xylene and the like for two weeks and examining the coating after exposure. Abrasion resistance is determined by the Taber Abrasion Resistance Test as described in Fed. Spec. CC-T-191b Method 5306. This test is useful in determining wearing properties of coatings, that is, their ability to resist abrasion.

The tensile strength and percent elongation at the break point of the coatings are determined by the following procedure. A free film is prepared by coating the surface of a nonpermeable material such as a metal panel, glass plate or the like. The film is then removed from the surface and is cut into microtensile strength specimens measuring one quarter inch by one inch and conditioned at 75° C. and 50% relative humidity for 48 hours. The specimen is clamped between the jaws of a Modified Dillon Tester (W. C. Dillon Co., Inc., Chicago, Ill.) and the jaws are then separated at a crosshead speed of one inch per minute until the specimen fails. From the stress-strain curve obtained in these tests, the tensile strength and percent elongation at the break point are calculated.

Evaluation of the cured linear thermoplastic polyurethane resin compositions of this invention by the abovementioned tests show that they are excellent moisture vapor barriers for permeable materials. Furthermore, these tests show that films formed by these resin compositions have highly desirable properties such as high gloss, abrasion resistance, high tensile strength, high elongation, flexibility, water resistance, solvents resistance and the like when applied as coatings to permeable materials. Additional details on the above tests and the results obtained with these tests are given in the examples below.

POLYURETHANE EMULSIONS

The polyurethane resin compositions described above can be used in the form of emulsions. Emulsions of both the cured polyurethane resins and their lacquers, that is, polyurethane resin compositions containing solvents can be prepared. Emulsions of the polyurethane resins disclosed in the present invention have numerous advantages. Since they contain water, they are not hazardous to produce and use. Further, they are inexpensive to produce and use. Since they are compatible with water, they are easy to produce and use in conventional equipment. Equipment in which these emulsions are used can be cleaned with water and/or steam. Use of costly solvents in cleaning coating equipment in which emulsions are used is not necessary. Their compatibility with water makes polyurethane emulsions particularly suitable for application during the wet web stage in paper making. They have good hold out on paper substrates, that is, there is little penetration of the substrate so excessive amounts of emulsion are not required. Emulsions do not attack plastic films, that is, they do not soften or damage plastic films. Further, emulsions of the polyurethane resins disclosed herein form coatings having outstanding moisture vapor barrier properties which are comparable to those obtained with the solvent based compositions. The emulsions form continuous films they are applied to permeable materials and dried. The outstanding results obtained with emulsion coatings are attributed to the excellent moisture vapor barrier properties of the resins, and their ability to form continuous films as well as to the other desirable properties described herein.

The emulsions contain (a) about 6 parts by weight to about 20 parts by weight of an emulsifier per 100 parts by weight of the cured polyurethane resin, (b) about 25 parts by weight to about 10,000 parts by weight of water per 100 parts by weight of cured resin and (c) about 0 part by weight to about 1,000 parts by weight of volatile inert solvent per 100 parts by weight of the cured resin. The emulsions are usually prepared by mixing the resin and emulsifier with water. If desired, the resin can be dissolved in a volatile inert solvent to obtain a solution. An emulsifier can then be added and the resulting mixture emulsified. The ingredients can be added in any desired order. That is, the resin and emulsifier can be added to the water or vice versa. Any conventional methods of emulsification such as mechanical mixing, homogenization, colloid mills and the like can be used. If desired, elevated temperatures can be used during emulsification if provisions are made to prevent loss of volatile ingredients such as water and solvents. When desired, concentrated emulsions can be prepared and later diluted to the desired concentration prior to use.

The cured linear polyurethane resins and solvents described in the preceding section can be used in the preparation of the emulsions. Use of solvents is optional. If desired, lacquers, that is, resins containing solvents can be emulsified and the solvents removed from the emulsion.

The emulsifier can be any surfactant or mixture of surfactants which will form an oil-in-water emulsion of the resin or lacquer and which will not react with the cured resin or any solvent present. The preferred surfactants are nonionic surfactants, either alone or in combination with anionic surfactants. Nonionic surfactants include polyalkylene oxide condensates of alkylated phenols such as the condensation product of one mole of nonyl phenol and nine moles of ethylene oxide, polyalkylene oxide condensates of alcohols such as the condensation product of one mole of tridecyl alcohol and nine moles of ethylene oxide, polyalkylene glycol esters of saturated and unsaturated fatty acids having from about 8 to 30 carbon atoms in the fatty acid portion such as the condensation product of one mole of tall oil fatty acids and eighteen moles of ethylene oxide, block copolymers consisting of polypropylene oxide and polyethylene oxide blocks referred to as Pluronics whose molecular weights range from about 600 to about 100,000. The Tergitol surfactants which are polyalkylene glycol ethers, sold by Union Carbide Corporation and have molecular weights ranging from about 1000 to about 50,000 may be used. Spans and Tweens such as sorbitan monooleate, sorbitan monolaurate, sorbitan monopalmitate, sorbitan monostearate, sorbitan tristearate, sorbitan trioleate, polyoxyethylene sorbitan monolaurante, polyoxyethylene sorbitan monopalmitate, polyoxyethylene sorbitan monostearate and the like can also be used as emulsifiers. Specific examples include Span 20, Span 40, Span 60 and Span 85 and Tween 20, Tween 40, Tween 60 and Tween 80.

Anionic surfactants which may be used in conjunction with the nonionic surfactants include the sodium and potassium sulfonates of alkylbenzenes, alkylnaphthalenes such as the sodium sulfonate of dodecylbenzene, sodium sulfonate of hexylnaphthalene, potassium sulfonate of octylnaphthalene and the like; sodium and potassium salts of naphthalenes, alkyl naphthalenes and alkylbenzenes condensed with formaldehyde such as the sodium sulfonate of naphthalene condensed with formaldehyde, ammonium salt of diphenylmethane disulfonic acids, potassium salt of dixylylmethane disulfonic acids and the like; sodium and potassium sulfates of linear and branched alcohols such as the sodium sulfate of lauryl alcohol, the potassium sulfate of tridecyl alcohol (oxo alcohol), the sodium sulfate of oleyl alcohol; sodium and potassium sulfates of alkylene oxide condensates of alkylphenol such as the ammonium sulfate of the condensation product of one mole of nonylphenol and four moles of ethylene oxide, the sodium sulfate of the condensation product of octylphenol and three moles of ethylene oxide and the like; sodium and potassium sulfates of alkylene oxide condensates of alcohols such as the sodium sulfate of the condensation product of lauryl alcohol and four moles of ethylene oxide, the potassium sulfate of the condensation product of oleyl alcohol and three moles of ethylene oxide and the like; alkyl esters of sodium and potassium sulfo succinates such as the dihexyl ester of potassium sulfo succinate, the diethylhexyl ester of sodium sulfo succinate and the like. The corresponding alkyl and aromatic phosphonates and phosphate esters can also be used. Useful phosphonates and phosphates include the sodium salt of dodecylbenzene phosphonate, the potassium salt of dodecyl phosphate, the sodium phosphate of the condensation product of nonylphenol and six moles of ethylene oxide and the like.

The abovementioned surfactants and surfactant mixtures include those having cloud points from about 5° C. to over 100° C. with the preferred cloud point range being from about 50° C. to over 100° C. The term "cloud point of over 100° C." is well known in the surfactant art and means that the surfactant solution does not cloud at its boiling point.

Emulsions containing cured linear thermoplastic polyurethane resins can be applied to permeable materials by any of the application methods described previously. Since the polymers are cured, the only processing required after application of the coating to the permeable material is drying to remove water and any volatile solvents that may be present. Drying is usually carried out at a temperature of from about 25° C. to about 150° C.

The emulsions are evaluated both as coatings for permeable materials and as free films. The Moisture Vapor Transmission Rate of coatings is determined by the procedure described previously and in the examples. Emulsions producing MVTR values of 15 g./sq. meter/24 hr. or greater are considered unsatisfactory. The hardness of coatings produced by the emulsions is determined by the pencil hardness test. Gloss value of coatings produced by the emulsions is determined with a Gardner Glossmeter at a 60° angle. Solvent resistance of the emulsion coatings is determined by exposure of the coating to solvents such as water, chlorinated hydrocarbon solvents, xylene and the like for a two week period and examining the coatings after exposure. Abrasion resistance is determined by the Taber Abrasion Resistance Test as described in Fed. Spec. CC–T–191b Method 5306. Free films are prepared from the emulsions and evaluated by the procedure described in the preceding section and in the examples.

Evaluation of coatings produced from emulsions of cured linear thermoplastic polyurethane resins by the abovementioned test methods shows that the emulsions form coatings which are excellent moisture barriers. Furthermore, these tests show that films formed from the emulsions have other highly desirable coating properties such as high gloss, abrasion resistance, high tensile strength, high percent of elongation, heat sealability, flexibility, water resistance, solvent resistance and the like when used as coatings on the permeable materials described above. Additional details on these tests and the results obtained with emulsion coatings are given in the examples below.

For a fuller understanding of the nature and objects of this invention, reference may be made to the following examples which are given merely to illustrate the invention and are not to be construed in a limiting sense. All weights, proportions and percentages are on a weight basis unless otherwise indicated. Likewise, all temperatures are ° C. unless otherwise indicated.

Example I (A) Preparation of first prepolymer.—348 g. (2 moles) of tolylene diisocyanate (80% 2,4-isomer and 20% 2,6-isomer) was charged into a clean, dry glass flask equipped with agitator, external heating and cooling facilities as well as provisions for maintaining a nitrogen blanket over the reactants to provide anhydrous conditions during reaction. The tolylene diisocyanate was heated under nitrogen at about 30° C. to about 40° C. and 392 g. (1 mole) of polypropylene glycol having an average molecular weight of 400 and a hydroxyl number of 286 was added over 30 minutes. The reaction mixture was heated at about 55° to about 85° C. for three hours. Heating at about 55° to about 85° C. was continued until a prepolymer having an isocyanate content of 10.5–10.9% by weight was obtained. The prepolymer was then cooled to room temperature and stored under anhydrous conditions.

(B) Preparation of second prepolymer.—348 g. (2 moles) of tolylene diisocyanate (80% 2,4-isomer and 20% 2,6-isomer) was charged into a clean, dry flask of the type described in part (A) above and heated under nitrogen at about 30° C. to about 40° C. 90 g. (1 mole) of 1,4-butanediol and 438 g. methyl ethyl ketone were added to the tolylene diisocyanate and the resulting reaction mixture heated at about 65° C. to about 85° C. for three hours. Heating was continued at about 65° C. to about 85° C. until a prepolymer having an isocyanate content of 9.20–9.60% by weight was obtained. The prepolymer was cooled to room temperature and stored under anhydrous nitrogen.

(C) Preparation of a polyurethane resin coating composition.—800 g. (1 mole) of the first prepolymer obtained in part (A) above and 876 g. (1 mole) of the second prepolymer obtained in part (B) above were charged to a flask. 90 g. (1 mole) of 1,4-butanediol and 104 g. (1 mole) of neopentyl glycol dissolved in 960 g. methyl ethyl ketone were charged to the flask. The butanediol and neopentyl glycol were added as chain extenders. The resulting reaction mixture was heated to about 65° C. to about 85° C. and then refluxed at about 65° C. to about 85° C. to obtain a polyurethane resin having an isocyanate content of 0.2–0.005% by weight. The resulting polyurethane resin composition, which was a 50% by weight solution of polyurethane resin dissolved in methyl ethyl ketone, was stabilized with alcohol, that is, a small amount of isopropanol was added to react with any residual reactive isocyanate groups remaining in the polyurethane resin. The stabilized composition was then cooled to room temperature, filtered and stored under anhydrous nitrogen.

The composition was a light yellow viscous liquid containing 50% by weight of cured linear thermoplastic polyurethane resin. The composition had a Gardner color of 1–2 and a Gardner viscosity of $Z_5-Z_6$. A free film prepared from the composition had a tensile strength of 7250 p.s.i. and an elongation of 13% when tested with a Modified Dillon Tester (W. C. Dillon Co., Inc., Chicago, Ill.). The free film was prepared by coating the upper surface of a tin plated steel panel with the polyurethane composition using a Bird applicator. A 3 mil wet film was formed on the panel and dried at 100° C. The dry film was removed from the panel by amalgamation with mercury. The free, unsupported film was conditioned at 75° F. and 50% relative humidity for 48 hours. The film, which was of uniform thickness, was cut into microtensile strength specimens measuring one-half inch by two inches. Each specimen was clamped between the jaws of a tensile strength tester and the jaws were then separated at a crosshead speed of one inch per minute until the specimen failed. The tensile strength and percent elongation at the break point were calculated from the stress-strain curve obtained with the free film specimens in these tests.

The composition was evaluated for abrasion resistance in the following manner. A 5 to 6 mil wet film was applied to a steel panel using a Bird applicator and the film dried on the panel to produce a coated panel. The coated panel was tested for abrasion resistance with a 1000 g. load and a CS-10 stone using a Taber Abraser, the Standard Abrasion Tester (The Taber Instrument Corp., North Tonawanda, N.Y.). A coating loss of 51 mg. per 1000 cycles was obtained in the abrasion resistance test indicating that the coating had excellent abrasion resistance. The coating also had excellent solvent resistance. It did not show any evidence of attack after exposure for 2 weeks to solvents such as water, Perclene (chlorinated solvents) and xylene.

The composition was applied on glassine paper using a 1 mil Bird applicator without penetration or sag and exhibited excellent flowout and levelling characteristics. The dried coated paper gave a strong heat seal at about 270° F. After storage of the coated film for one hour at 120° C. in a closed container, no evidence of odor development was noted. Flexibility of the film remained unchanged and unimpaired after the film had been stored for two hours at 0° F. The coating did not block after 16 hours under an applied pressure of one p.s.i. at 120° F. Further, the coated paper had a coefficient of friction (ASTM D-1894-63) on glassine paper to paper of 0.68 and on paper to metal of 0.19.

Example II

Preparation of a polyurethane resin coating composition.—800 g. (1 mole) of the prepolymer obtained in part (A) of Example I was charged into a clean, dry glass flask containing an anhydrous nitrogen atmosphere. 348 g. (2 moles) of tolylene diisocyanate (80% 2,4-isomer and 20% 2,6-isomer), 312 g. (3 moles) of neopentyl glycol and 1492 g. of methyl ethyl ketone were charged over 30 minutes to the prepolymer in the flask. The reaction mixture was heated at about 65° C. to about 85° C. until the isocyanate content of the resulting reaction product was 0.2–0.05% by weight. The reaction product was a polyurethane resin composition which contained 50% by weight of cured linear thermoplastic polyurethane resin dissolved in methyl ethyl ketone. The polyurethane resin composition was then stabilized with alcohol by adding a small amount of isopropanol to react with any residual reactive isocyanate groups remaining in the polyurethane resin. The stabilized composition was then cooled to room temperature, filtered and stored under anhydrous nitrogen.

The composition was a light yellow viscous liquid containing 50% solids. It had a Gardner color of 1–2, a Gardner viscosity of $A_5-Z_6$ and an isocyanate content of 0.00% by weight. A free film prepared from the composition had a tensile strength of 6240 p.s.i. and an elongation of 11% when tested with a Modified Dillon Tester by the procedure described in Example I(C) above. The composition was also applied to a steel panel and dried to produce a coated panel. The coated panel tested for abrasion resistance with a 1000 g. load and a CS-10 stone using a Taber Abraser. A coating loss of 44 mg. per thousand cycles was obtained in the abrasion resistance test indicating that the coating had excellent abrasion resistance.

Example III (A) Preparation of prepolymer.—348 g. (2 moles) of tolylene diisocyanate (80% 2,4-isomer and 20% 2,6-isomer) was charged into a clean, dry flask equipped with agitator, external heating and cooling facilities as well as provisions for maintaining a nitrogen blanket over the reactants to provide anhydrous conditions during reaction. The charge was heated under anhydrous nitrogen at about 30° to about 40° C. and 540 g. of polybutylene glycol having an average molecular weight of 500 and containing 6.32% by weight of hydroxyl groups was added over thirty minutes. The reaction mixture was heated at about 65° to about 85° C. for three hours. Heating at about 65° to about 85° C. was continued until the resulting prepolymer had an isocyanate content of 9.3–9.6% by weight. The prepolymer was then cooled to room temperature and stored under anhydrous nitrogen.

(B) Preparation of a polyurethane resin coating composition.—888 g. (1 mole) of the prepolymer obtained in part (A) above, 876 g. (1 mole) of the prepolymer obtained in part (B) of Example I, 208 g. (2 moles) of neopentyl glycol and 1096 g. of methyl ethyl ketone were charged under anhydrous nitrogen into a clean, dry flask. The resulting reaction mixture was heated at about 65° to about 85° C. until the isocyanate content was 0.2–0.005% by weight to obtain a polyurethane composition which was a 50% by weight solution of cured linear thermoplastic polyurethane resin dissolved in methyl ethyl ketone. The polyurethane composition was then stabilized with alcohol, that is, a small amount of isopropanol was added to react with any residual reactive isocyanate groups remaining in the polyurethane resin.

The stabilized composition was then cooled to room temperature, filtered and stored under anhydrous nitrogen. The composition was a light yellow viscous liquid having a Gardner color of 1–2, a Gardner viscosity of $Z_4-Z_5$ and an isocyanate content of 0.00% by weight. A free film prepared from the composition had a tensile strength of 3200 p.s.i. and an elongation of 226% when tested with a Modified Dillon Tester.

Example IV

This example illustrates the preparation of a polyurethane resin composition which is outside of the scope of the present invention, i.e., neopentyl glycol was not employed in the preparation of the polyurethane resin.

(A) Preparation of a prepolymer.—348 g. (2 moles) of tolylene diisocyanate (80% 2,4-isomer and 20% 2,6-isomer) was charged into a clean, dry glass flask equipped with agitator, external heating and cooling facilities as well as provisions for maintaining a nitrogen blanket over the reactants to provide anhydrous conditions during reaction. The tolylene diisocyanate was heated under a dry nitrogen atmosphere at about 30° to about 40° C. and 1004 g. (1 mole) of polypropylene glycol having an average molecular weight of 1025 and a hydroxyl number of 112 was added over 30 minutes. The reaction mixture was heated under anhydrous conditions at about 55° to about 85° C. for three hours to obtain a prepolymer having a reactive isocyanate content of 6.0–6.3% by weight. The prepolymer was then cooled to room temperature and stored under anhydrous nitrogen.

(B) Preparation of a polyurethane resin composition.—800 g. (1 mole) of the prepolymer obtained in part (A) above of Example I, 342 g. (0.25 mole) of the prepolymer obtained in part (A) above of this example, 112.5 g. (1.25 mole) of 1,4-butanediol and 1254 g. of methyl ethyl ketone were charged to the flask. The butanediol was added as a chain extender. The resulting reaction mixture was heated at about 65° to about 85° C. and then refluxed at about 65° to about 85° C. to obtain a polyurethane resin having an isocyanate content of 0.2–0.005% by weight. The resulting reaction product was a polyurethane resin composition containing 50% by weight of polyurethane resin dissolved in methyl ethyl ketone. The polyurethane composition was stabilized with alcohol, that is, a small amount of isopropanol was added to react with any residual isocyanate groups remaining in the polyurethane resin. The stabilized composition was then cooled to room temperature, filtered and stored under anhydrous nitrogen.

A free film prepared from the composition had a tensile strength of 2240 p.s.i. and an elongation of 225% when tested with a Modified Dillon Tester. The composition was also evaluated for abrasion resistance in the following manner. A 5 to 6 mil wet film was applied to a steel panel using a Bird applicator and the wet film dried to produce a coated panel. The abrasion resistance of the coated panel was tested with a 1000 g. load and a CS-10 stone using a Taber Abraser. A coating loss of 21 mgm. per thousand cycles was obtained in this abrasion resistance test indicating that the coating had excellent abrasion resistance.

Example V

Preparation of a polyurethane resin coating composition.—696 g. (4 mole) of tolylene diisocyanate (80% 2,4-isomer and 20% 2,6-isomer) were charged into a clean, dry flask equipped with agitator, external heating and cooling facilities as well as provisions for maintaining a nitrogen blanket over the reactants during reaction to provide anhydrous conditions. The tolylene diisocyanate was heated under anhydrous conditions and under anhydrous nitrogen at about 30° to about 40° C. and 1048 g. (1 mole) of polypropylene glycol having an average molecular weight of 1040 and a hydroxyl number of 107, 312 g. (3 mole) of neopentyl glycol and 2048 of anhydrous methyl ethyl ketone were added over thirty minutes. The reaction mixture was heated at about 55° to about 85° C. until a polyurethane composition in the form of a solution having an isocyanate content of 0.2–0.01% by weight was obtained. The polyurethane composition was stabilized with alcohol, that is, a small amount of isopropanol was added to react with any residual reactive isocyanate groups remaining in the resin. The stabilized resin composition was then cooled to room temperature, filtered and stored under nitrogen. The resin solution was a light yellow viscous liquid containing 50% by weight of cured linear thermoplastic polyurethane resin. The solution had a Gardner viscosity of $Z_4$–$Z_5$ and a Gardner color of 1–2. The isocyanate content of the resin was 0.0% by weight.

Example VI

Preparation of a polyurethane resin coating composition.—600 g. (0.75 mole) of the prepolymer obtained in Example I(A) above was charged into a clean, dry glass flask containing an anhydrous nitrogen atmosphere. 342 g. (0.25 mole) of the prepolymer obtained in Example IV(A) above was then added. 348 g. (2 mole) of tolylene diisocyanate (80% 2,4-isomer and 20% 2,6-isomer), 312 g. (3 mole) of neopentyl glycol and 1602 g. of anhydrous methyl ethyl ketone were charged over thirty minutes to the mixture of the two prepolymers in the flask. The reaction mixture was heated under anhydrous conditions at about 65° to about 85° C. until the isocyanate content of the resulting polyurethane resin was 0.2–0.05% by weight. The resulting polyurethane resin solution which contained 50% by weight of polyurethane resin dissolved in methyl ethyl ketone, was stabilized with isopropanol by adding a small amount of the alcohol to react with any residual reactive isocyanate groups remaining in the polyurethane resin. The stabilized resin solution was then cooled to room temperature, filtered and stored under anhydrous nitrogen. The resin solution, which was the desired polyurethane resin composition, had a Gardner color of 1–2 and a Gardner viscosity of $Z_4$–$Z_5$. The isocyanate content of the resin solution was 0.0% by weight.

Example VII

Preparation of a polyurethane resin coating composition.—800 g. (1 mole) of the prepolymer obtained in Example I(A) above was charged into a clean, dry glass flask containing an anhydrous nitrogen atmosphere. 104 g. (1 mole) of neopentyl glycol and 904 g. of methyl ethyl ketone were charged over thirty minutes to the prepolymer in the flask. The reaction mixture was heated under anhydrous conditions at about 65° C. to about 85° C. until the isocyanate content of the resulting polyurethane resin was 0.2–0.05% by weight. The resin was then stabilized, that is, a small amount of isopropanol was added to completely react any residual reactive isocyanate groups remaining in the polyurethane resin. After stabilization, the solution was cooled to room temperature, filtered and stored under nitrogen. The solution contained 50% by weight of polyurethane resin and was the desired linear thermoplastic polyurethane resin composition. The composition had a Gardner viscosity of $Z_5$–$Z_6$, a Gardner color of 1–2 and an isocyanate content of 0.00% by weight.

Example VIII

Preparation and application of type II moisture curing urethane polymers which are the polymers employed by the prior art.—This example demonstrates that these resin compositions do not have the useful, desired and required properties exhibited by the resin compositions of the present invention.

(A) A reaction mixture consisting of 102.5 g. (0.1 mole) of propylene glycol having an average molecular weight of 1025, 6.7 g. (0.05 mole) of trimethylolpropane, 17.0 g. (0.05 mole) of the propylene oxide adduct of trimethylolpropane having an average molecular weight of 340, and 69.6 g. (0.4 mole) of tolylene diisocyanate (80% 2,4-isomer and 20% 2,6-isomer) in 66 g. of Cellosolve acetate ($CH_3COOCH_2CH_2OC_2H_5$) and 66 g. of dry xylene were reacted under anhydrous conditions and under an anhydrous nitrogen blanket at about 70° to about 75° C. for about five hours. The isocyanate content after five hours of reaction at the above temperatures was 3.8% by weight.

To 100 g. of the polyurethane solution formed above were added and dissolved 0.2 g. of triethylene diamine and 0.2 g. of dibutyl tin dilaurate as catalysts. The resulting solution was then used to coat glassine paper at a wet film thickness of about 1 mil using a nylon Jack Applicator (Gardner Labs) and the coated paper was then heated at 380° F. for two minutes to obtain a tack-free, glossy coated glassine sheet.

mentioned solvents. The gloss value of the coated paper was determined by the Gardner Glossmeter at a 60° angle. Results of these tests are shown in Table I below.

The data in Table I show that compositions of Examples IV, VIII(A) and VIII(B) produce coatings on glassine paper which have unsatisfactory MVTR properties, that is, the MVTR values are in excess of 15 whereas the composition of Examples I, II, III, V, VI and VII produce coatings on glassine paper which have satisfactory MVTR properties, that is, the MVTR values are below 15.

TABLE I.—PROPERTIES OF COATED GLASSINE PAPER

| Paper coated with the composition of Example | Moisture vapor transmission rate (MVTR) g./sq. meter/24 hr. | Remarks. |
|---|---|---|
| I | 5.5 | Heat seals. Coating resistant to water, chlorinated hydrocarbons and xylene after 2 weeks exposure. The coated paper had a gloss value of over 65. Pencil hardness was 2H-3H. |
| II | 5.4 | Heat seals. Coating resistant to water, chlorinated hydrocarbons and xylene after 2 weeks exposure. Pencil hardness was 2H. |
| III | 7.0 | Heat seals. Coating resistant to water, chlorinated hydrocarbons and xylene after 2 weeks exposure. |
| IV | 24.0 | Heat seals. Coating resistant to water, chlorinated hydrocarbons and xylene after 2 weeks exposure. Pencil hardness 1H. |
| V | 12.5 | Heat seals. Coating resistant to water, chlorinated hydrocarbons and xylene after 2 weeks exposure. |
| VI | 9.5 | Heat seals. Coating resistant to water, chlorinated hydrocarbons and xylene after 2 weeks exposure. |
| VII | 6.5 | Heat seals. Coating resistant to water, chlorinated hydrocarbons and xylene after 2 weeks exposure. |
| VIII(A) | 22.9 | Resistant to water, xylene and chlorinated solvents for 2 weeks. Does not heat seal. Is nonblocking. Glossy. |
| VIII(B) | 21.7 | Resistant to water, xylene and chlorinated solvents for 2 weeks. Does not heat seal. |
| Control | 200 | Uncoated glassine paper used in these tests. |

(B) A mixture of 31.8 g. (0.3 mole) of diethylene glycol, 43.8 g. (0.3 mole) of adipic acid and 13.4 g. (0.1 mole) of trimethylolpropane was heated at about 235° to about 240° C. for about ten hours. 10.8 g. (0.6 mole) of water was removed from the reaction mixture by distillation. Reaction was discontinued when the AV (Acid Value) dropped below two. The resulting reaction product was a polyester. To this polyester was added 40 g. (0.1 mole) of a polypropylene glycol having an average molecular weight of 400, 69.6 g. (0.4 mole) of tolylene diisocyanate (80% 2,4-isomer and 20% 2,6-isomer), 94 g. of Cellosolve acetate and 94 g. of xylene. The resulting mixture was reacted under anhydrous conditions and under an anhydrous nitrogen blanket at about 70° to about 75° C. for about five hours. The isocyanate content of the reaction mixture after five hours of reaction at the above temperatures was 3.3% by weight.

To 100 g. of the polyurethane solution obtained above were added and dissolved 0.17 g. of triethylene diamine and 0.17 g. of dibutyl tin dilaurate as catalyst. The resulting solution was then used to coat glassine paper at a wet film thickness of about 1 mil using a nylon Jack Applicator (Gardner Labs) and the coated paper was then heated at 300° F. for about two minutes to obtain a tack-free glossy coated glassine sheet.

Example IX

Evaluation of the polyurethane coating compositions obtained in the foregoing examples.—The polyurethane coating compositions obtained in Examples I through VIII(B) above were applied to glassine paper using a nylon Jack Applicator (Gardner Labs). The resulting coated papers were dried at 150° C. for one minute to obtain dry coatings having an aveavrge thickness of 0.5 mil. The dried coatings were evaluated in the following manner. The Moisture Vapor Transmission Rate (MVTR) of the coated paper, that is, the grams of water transmitted through 1 sq. meter of coated paper per 24 hours was determined by the TAPPI T-448-M-49 Test. The transmission rates were measured at 50% relative humidity and 73° F. The pencil hardness of the dried coating was also determined. The solvent resistance of the dried coating was determined by placing the coated paper in contact with solvents such as water, chlorinated hydrocarbon solvents and xylene for two weeks. At the end of the two-week exposure period, the coated paper was examined to determine if it was resistant to the above- Example X The composition of Example I above was applied on a super calendered kraft-30 lb. weight paper using a one mil Bird applicator without penetration or sag. The composition exhibited excellent flowout and levelling characteristics. The coating showed good heat sealing at about 270° F., did not have any odor after one hour of storage in a sealed container at 120° F., and exhibited unchanged and unimpaired flexibility after two hours of exposure at 0° F. The coating did not block after 16 hours under an applied pressure of one p.s.i. at 120° F. and had a coefficient of friction (ASTM D-1894-63) on paper to paper of 0.42 and on paper to metal of 0.19. The MVTR of the coated super calendered kraft was 7 g./sq. meter /24 hr.

Example XI

Preparation of an emulsion of a polyurethane resin composition.—To 20 g. of the polyurethane resin composition obtained in Example IV above was added 1.5 g. of an emulsifier, Tergitol XD (Union Carbide Chemicals Co.) which was a polyoxyalkylene ether surfactant having a hydroxyl number of about 18 and a cloud point of 60° to 65° C. in a 0.5% by weight solution in distilled water. The resulting mixture was stirred until homogeneous. Then water was added slowly with agitation until a smooth uniform heavy paste was obtained. Addition of water was stopped and the paste stirred to insure uniformity. Water addition with agitation was then continued until a total of 9.5 g. of water was added. The resulting emulsion was stirred for an additional thirty minutes. The emulsion contained 37% by weight non-volatiles, that is, components which were not volatilized when the composition was heated at temperatures of from about 280° F. to about 400° F.

Example XII

Preparation of an emulsion of a polyurethane resin composition.—To 20 g. of the polyurethane resin composition obtained in Example IV above was added 1.5 g. of an emulsifier, Renex 20 (Atlas Chemical Industries Inc.) which was a polyoxyethylene ester of mixed fatty acids and resins. The mixture was stirred until homogenous. Water was then added until a smooth heavy paste was obtained. Water addition was stopped and the paste was stirred to insure uniformity. Water addition with agitation was then resumed and continued until a total of 9.5 g. of water was added. The resulting emulsion contained 37% by weight non-volatiles.

Example XIII

Preparation of an emulsion of a polyurethane resin composition.—To 20 g. of the polyurethane resin composition obtained in Example IV above was added 1.5 g. of an emulsifier, Pluracol F–77 (Wyandotte Chemical Corporation) which was a mixture of polyoxypropylene and polyoxyethylene compounds having an average molecular weight of about 7000. The mixture was stirred until homogenous and then water was added slowly with stirring until a smooth heavy past was obtained. Water addition was stopped and the paste was stirred until uniform. Water addition with stirring was then resumed and continued until a total of 9.5 g. of water was added. The resulting emulsion was stirred an additional 30 minutes. The emulsion contained 37% by weight non-volatile solids.

Example XIV

Preparation of an emulsion of a polyurethane resin composition.—To 20 g. of the polyurethane resin composition obtained in Example IV above was added 0.75 g. of an emulsifier, Tergitol XD and 0.75 g. of an emulsifier, Atlas G3300 which was an anionic alkyl aryl sulfonate. The mixture was stirred until homogenous. Water was then added slowly with agitation until a smooth heavy paste was obtained. Water addition was discontinued and the paste was stirred to insure uniformity. Water addition with stirring was then resumed and continued until a total of 9.5 g. of water was added. The resulting emulsion which contained 37% by weight non-volatiles was stirred an additional thirty minutes to insure uniformity.

Example XV

Preparation of an emulsion of a polyurethane resin composition.—To 20 g. of the polyurethane resin composition obtained in Example I above was added 2.0 g. of an emulsifier, Tergitol XD. The mixture was stirred until homogenous and then water was added slowly with stirring until a smooth heavy paste was obtained. Water addition was then discontinued and the resulting paste was stirred to insure uniformity. Water addition with stirring was then resumed and continued until a total of 12 g. of water was added. The resulting emulsion which contained 35% by weight non-volatiles was then stirred for an additional thirty minutes to insure uniformity.

Example XVI

Preparation of an emulsion of a polyurethane resin composition.—To 20 g. of the polyurethane resin composition obtained in Example I above was added 2.0 g. of an emulsifier, Renex 20. The mixture was stirred until homogenous and then water was added slowly with stirring until a smooth heavy paste was obtained. Water addition was discontinued and the paste was stirred to insure uniformity. Water addition with stirring was then resumed and continued until a total of 12 g. of water was added. The resulting emulsion which contained 35% by weight non-volatiles was stirred an additional thirty minutes to insure uniformity.

Example XVII

Preparation of an emulsion of a polyurethane resin composition.—To 20 g. of the polyurethane resin composition obtained in Example I above was added 2.0 g. of an emulsifier, Pluracol F–77. The mixture was stirred until homogenous. Water was then added slowly with stirring until a smooth heavy paste was obtained. Water addition was then stopped and the paste was stirred until uniform. When the paste was uniform, water addition with stirring was resumed and continued until a total of 12 g. of water was added. The resulting emulsion which contained 35% by weight non-volatile solids was stirred an additional thirty minutes to insure uniformity.

Example XVIII

Preparation of an emulsion of a polyurethane resin composition.—To 20 g. of the polyurethane resin composition obtained in Example I above was added 1.0 g. of an emulsifier, Tergitol XD and 1.0 g. of an emulsifier, Atlas G3300. The mixture was stirred until uniform and then water was added slowly with stirring until a smooth heavy paste was obtained. Water addition was stopped and the paste was stirred until uniform. When the paste was uniform, water addition with stirring was resumed and continued until a total of 12 g. of water was added. The resulting emulsion which contained 35% by weight non-volatile solids was stirred an additional thirty minutes to insure uniformity.

Example XIX

Preparation of an emulsion of a polyurethane resin composition.—To 20 g. of the polyurethane resin composition obtained in Example II above was added 2.0 g. of an emulsifier, Tergitol XD. The mixture was stirred until homogenous and then water was added slowly with stirring until a smooth heavy paste was obtained. Water addition was then discontinued and the resulting paste was stirred to insure uniformity. Water addition with stirring then resumed and continued until a total of 12 g. of water was added. The resulting emulsion which contained 35% by weight non-volatiles was then stirred for an additional thirty minutes to insure uniformity.

Example XX

Evaluation of the polyurethane emulsions obtained in the foregoing examples.—The polyurethane emulsions obtained in Examples XI, XV and XIX above were applied to glassine paper by means of a nylon Jack Applicator (Gardner Labs). The resulting coated papers were dried at 150° C. for one minute to obtain dry coatings having an average thickness of about 0.5 mil. The dried coatings were evaluated in the following manner. The Moisture Vapor Transmission Rate (MVTR) of the coated paper, that is, the grams of water transmitted through one square meter of coated paper per 24 hours was determined by the TAPPI T–448–M–49 Test. The transmission rates were determined at 50% relative humidity and 73° F. Further, the solvent resistance of the dried coatings was determined by placing the coated paper in contact with solvents such as water, chlorinated hydrocarbon solvent and xylene for two weeks. At the end of the two week exposure period, the coating was examined to determine if it was resistant to these solvents. Results of these tests are shown in Table II below.

TABLE II.—PROPERTIES OF COATED GLASSINE PAPER

| Paper coated with the emulsion of Example | Moisture vapor transmission rate (MVTR) g./sq. meter/24 hr. | Remarks |
| --- | --- | --- |
| XI | 24.8 | Heat seals. Coating resistant to water, chlorinated hydrocarbons and xylene after 2 weeks exposure. Very soft film having unsatisfactory MVTR propertis. |
| XV | 6.4 | Heat seals. Coating resistant to water, chlorinated hydrocarbons and xylene after 2 weeks exposure. Flexible soft film having satisfactory MVTR properties. |
| XIX | 7.7 | Heat seals. Coating resistant to water, chlorinated hydrocarbons and xylene after 2 weeks exposure. Flexible soft film having satisfactory MVTR properties. |
| Control | 200 | Uncoated glassine paper used in these tests. |

The data in Table II show that the emulsion of Example XI produced coatings on glassine paper which had unsatisfactory MVTR properties, that is, the MVTR value was in excess of 15 whereas the emulsions of Example XV and Example XIX produced coatings on glassine paper which had satisfactory MVTR properties, that is, the MVTR values were below 15.

Example XXI

Preparation of a solvent-free polyurethane resin emulsion.—30 g. of the emulsion prepared in Example XV was vacuum distilled under reduced pressure at 40° C. to 50° C. until 21 g. of the emulsion was left. The 21 g. of emulsion which remained contained 50% by weight nonvolatile solids and was free of organic solvent.

The resulting solvent-free emulsion of the polyurethane resin was stable and had properties comparable to those of the emulsion prepared in Example XV.

Example XXII

Preparation of chlorinated tolylene diisocyanate (TDI).—In accordance with the teachings of U.S. 2,915,545, Tazuma, 174 g. (1 mole) of TDI and 3 g. of ferric chloride were charged into a flask. The mixture was heated to between 80° C. and 100° C. and maintained at that temperature, while 250 g. of chlorine was bubbled slowly through the mixture over a period of 12 hours. The introduction of chlorine into the mixture was accompanied by continual stirring. At the end of this 12 hour period, 80 g. of the chlorine was taken up by the TDI. The resulting dark amber mass was then distilled under vacuum using a Vigreux Column. The initial boiling point of 70–80° C./1.0–1.5 min. yielded 8 g. of material, the later boiling point of 135–140° C./1.0–1.5 min. yielded 114 g. of a colorless material, for a total of 122 g. An amine equivalent was then run on the second (114 g.) fraction yielding (31.7 cc.) (20.2)/1.6 g.=40% NCO, or an equivalent weight of 105. The molecular weight is double the equivalent weight because the chlorinated substance is a diisocyanate, or 210. The theoretical molecular weight of monochlorinated TDI would be 173+35.5 or 208.5. Therefore, it was concluded that the above process had yielded monochlorinated TDI.

Example XXIII

Preparation of a polyurethane lacquer with chlorinated TDI.—A polyurethane lacquer was prepared which would have been within the scope of this invention except for the substitution of monochlorinated TDI for non-halogenated TDI. 50 g. (.238 mole) of the monochlorinated TDI prepared in Example XXII, and 42 g. (.119 mole) of a polyol mixture consisting of .033 mole of polypropylene glycol and .086 mole of butanediol were charged into a flask and heated for 4 hours at 60–65° C. to form a prepolymer. 175 g. (.12 mole) of this prepolymer, 5.4 g. (.06 mole) of butanediol, and 6.2 g. (.06 mole) of neopentyl glycol were charged into a second flask resulting in an exothermic reaction. The reaction mixture was then heated for 8 hours at 60–65° C. When the NCO (isocyanate) content was about .2% by weight, methanol was added and the resulting lacquer stirred for ½ hour.

Example XXIV

Preparation of chlorinated m-phenylene diisocyanate (PDI).—In accordance with the teachings of U.S. 2,915,545, Tazuma, 140 g. (.875 mole) of PDI and 3 g. of ferric chloride were charged into a flask and heated to about 150° C. While maintaining this temperature, 650 g. of chlorine was bubbled slowly through the mixture for a period of 10 hours. At the end of this period, 65 g. of the chlorine was taken up by the PDI. The resulting dark amber mass was then distilled under vacuum using a Vigroux Column. The main fraction of 102 g. was obtained at a boiling point of 130–135° C./.05 min. An amine equivalent was then run on this main fraction yielding (17.4 cc.) (20.2)/1.0 g.=35.2% NCO, or an equivalent weight of 119, and a molecular weight of 238. The theoretical molecular weight of dichlorinated PDI would be 159+71 or 230. Therefore, it was concluded that the above process had yielded dichlorinated PDI.

Example XXV

Preparation of a polyurethane lacquer with chlorinated PDI.—A polyurethane lacquer was prepared which was not within the scope of this invention. 50 g. (.21 mole) of the dichlorinated PDI prepared in Example XXIV, and 37 g. (.105 mole) of a polyol mixture consisting of polypropylene glycol and butanediol were charged into a flask and heated for 4 hours at 60–65° C. to form a prepolymer. 169 g. (.115 mole) of this prepolymer; 5.2 g. (.0575 mole) of butanediol, and 6.0 g. (.0575 mole) of neopentylglycol were charged into a second flask, resulting in an exothermic reaction. The reaction mixture was then heated for 8 hours at 60–65° C. When the NCO (isocyanate) content was about .2% by weight, methanol was added and the resulting lacquer stirred for ½ hour.

Example XXVI

Preparation of a polyurethane lacquer with non-halogenated TDI.—A polyurethane lacquer was prepared which was within the scope of this invention using the method of Example XXIII. The ingredients and their proportions were: 174 g. (1.0 mole) of non-halogenated TDI and 176 g. (5 mole) of polyol mixture in the prepolymer; and 690 g. (.51 mole) of said prepolymer, 23 g. (.255 mole) of butanediol, and 26.6 g. (.255 mole) of neopentyl glycol in the polyurethane lacquer.

Example XXVII

Preparation of a polyurethane lacquer with non-halogenated PDI.—80 g. (.5 mole) of PDI and 88 g. (.25 mole) of a polyol mixture consisting of polyethylene glycol and butanediol were charged into a flask and heated for 4 hours at 60–65° C., to form a prepolymer. 334 g. (.2575 mole) of this prepolymer, 11.5 g. (.128 mole) of butanediol, and 13.2 g. (.128 mole) of neopentyl glycol were charged into a second flask. Upon heating at 60–65° C. a gel was formed, whereupon heating was discontinued. This gel was found to be insoluble in most common organic solvents, although slightly soluble in dimethyl formamide.

Example XXVIII

Comparison of lacquers as moisture vapor transmission barriers.—Tests were run to determine the relative efficacy of the lacquers prepared in Examples XXIII, XXV and XXVI as moisture vapor transmission barriers. The tests were run according to TAPPI T–448–M–49, in the same manner as the tests described earlier. The lacquer was applied to glassine paper. The coated paper was then dried for 1 minute at 150° C. The average thickness of the coatings after drying was 0.5 mil. The results of the tests are as follows:

| Product of Example— | Initial weight, mg. | Weight after 5 days, mg. | Weight differential, mg. | Average weight gain in g./m.². 24 hrs. |
|---|---|---|---|---|
| XXIII: | | | | |
| a | 27.100 | 27.350 | 0.250 | 25.45 |
| b | 24.954 | 25.219 | 0.265 | |
| XXV: | | | | |
| a | 25.633 | 25.853 | 0.220 | 22.75 |
| b | 29.284 | 29.525 | 0.241 | |
| XXVI: | | | | |
| a | 25.582 | 25.638 | 0.056 | 5.195 |
| b | 25.213 | 25.264 | 0.051 | |

The above results shown that polyurethane lacquers which were prepared using halogenated diisocyanates (Examples XXIII and XXV) were significantly poorer moisture vapor barriers then a polyurethane lacquer which was prepared using a non-halogenated diisocyanate (Example XXVI). The weight gain of Examples XXIII and XXV were about 4–5 times the weight gain of Example XXVI (measured in grams of water per square meter per 24 hours). A lacquer weight gain is indicative of a less efficient moisture vapor barrier since such a barrier will permit a greater amount of water to pass through it. Therefore, the coating of Example XXVI, which was within the scope of this invention, is demonstrably superior to the examples of XXIII and XXV which were outside of the scope of this invention. No test of Example XXV was conducted, since a useful lacquer could not be produced due to that product's poor solubility.

Example XXIX

Comparison of lacquers as useful coatings.—A test was devised to determine whether the lacquers of Examples XXIII, XXV and XXVI were useful as paper coatings. Samples of glassine which had been coated with these lacquers were creased so as to stretch the coating at the point of folding. Methylene blue dye was then applied to the glassine in the area of the crease. If the coating remained unharmed by the folding, the glassine would be uniformly coated. If, however, the folding cracked the coating, the dye would penetrate to the glassine substrate and color it. The results of this test were that the dye penetrated to the substrate of glassine coated with the lacquers of Examples XXIII and XXV, but not Example XXVI. This clearly demonstrated that halogenated diisocyanates, which are outside the scope of this invention, are not useful in preparing suitable paper coatings.

What is claimed is:

1. A polyurethane resin lacquer composition which comprises:
    (A) about 100 parts by weight of a fully reacted linear thermoplastic polyurethane resin soluble in lacquer solvents comprising the reaction product of
        (1) about 1.00 mole of at least one organic diisocyanate selected from the group consisting of: tolylene diisocyanate; 1,4-tetramethylenediisocyanate; hexamethylene diisocyanate; 1,10-decamethylenediisocyanate; xylylene diisocyanate; 4,4'-methylene-bis (cyclohexane isocyanate); and a diisocyanate derived from dimer acids containing 36 carbon atoms,
        (2) about 0.10 mole to about 0.90 mole of neopentyl glycol, and
        (3) about 0.90 mole to about 0.10 mole of an organic dihydroxy compound selected from the group consisting of
            (a) a polyether selected from polypropylene glycol or polybutylene glycol or mixtures thereof having two terminal hydroxyl groups and having an average molecular weight of from about 300 to about 3000, and
            (b) a dihydric alcohol, other than neopentyl glycol, having only carbon to carbon bonds in the backbone and having from 2 to 20 carbon atoms,
        with the proviso that the NCO/OH ratio of said resin is substantially 1.00/1.00; and
    (B) about 1.10 to about 1000 parts by weight of a volatile organic solvent which does not contain active hydrogen atoms or other groups that are reactive with isocyanate groups,
and which is further characterized by being a moisture vapor barrier when applied to a permeable material.

2. A polyurethane resin emulsion composition which comprises:
    (A) about 100 parts by weight of a fully reacted linear thermoplastic polyurethane resin soluble in lacquer solvents comprising the reaction product of
        (1) about 1.00 mole of at least one organic diisocyanate selected from the group consisting of: tolylene diisocyanate; 1,4-tetramethylenediisocyanate; hexamethylene diisocyanate; 1,10-decamethylenediisocyanate; xylylene diisocyanate, 4,4'-methylene-bis (cyclohexane isocyanate), and a diisocyanate derived from dimer acids containing 36 carbon atoms,
        (2) about 0.10 mole to about 0.90 mole of neopentyl glycol, and
        (3) about 0.90 mole to about 0.10 mole of an organic dihydroxy compound selected from the group consisting of
            (a) a polyether selected from polypropylene glycol or polybutylene glycol or mixtures thereof having two terminal hydroxyl groups and having an average molecular weight of from about 300 to about 3000, and
            (b) a dihydric alcohol, other than neopentyl glycol, having only carbon to carbon bonds in the backbone and having from 2 to 20 carbon atoms,
        with the proviso that the NCO/OH ratio of said resin is substantially 1.00/1.00;
    (B) about 6 to about 20 parts by weight of an emulsifier;
    (C) about 25 to about 10,000 parts by weight of water; and
    (D) up to about 1000 parts by weight of a volatile organic solvent which does not contain active hydrogen atoms or other groups that are reactive with isocyanate groups,
and which is further characterized by being a moisture vapor barrier when applied to a permeable material.

3. A process of treating a permeable material selected from the group consisting of paper, paperboard, and plastic film, which comprises
    (A) applying to said material a coating of the composition of claim 1, and thereafter
    (B) drying the coating.

4. A process of treating a permeable material selected from the group consisting of paper, paperboard, and plastic film, which comprises
    (A) applying to said material a coating of the composition of claim 2, and thereafter
    (B) drying the coating.

5. A permeable material selected from the group consisting of paper, paperboard, and plastic film, having applied thereto the composition of claim 1.

6. A permeable material selected from the group consisting of paper, paperboard, and plastic film, having applied thereto the composition of claim 2.

7. A polyurethane resin lacquer composition according to claim 1, in which the organic diisocyanate is tolylene diisocyanate.

8. A polyurethane resin emulsion composition according to claim 2, in which the organic diisocyanate is tolylene diisocyanate.

9. A composition according to claim 1 in which the organic diisocyanate, the neopentyl glycol, and the organic dihydroxy compound are reacted simultaneously.

10. A composition according to claim 2 in which the organic diisocyanate, the neopentyl glycol, and the organic dihydroxy compound are reacted simultaneously.

11. A composition according to claim 1 in which the organic diisocyanate is first reacted with the organic dihydroxy compound and the resultant prepolymer is then reacted with the neopentyl glycol.

12. A composition according to claim 2 in which the organic diisocyanate is first reacted with the organic dihydroxy compound and the resultant prepolymer is then reacted with the neopentyl glycol.

13. A composition according to claim 1 in which the organic diisocyanate is first reacted with the neopentyl glycol and the resultant prepolymer is then reacted with the organic dihydroxy compound.

14. A composition according to claim 2 in which the organic diisocyanate is first reacted with the neopentyl glycol and the resultant prepolymer is then reacted with the organic dihydroxy compound.

15. A composition according to claim 1 in which a fraction of the organic diisocyanate is reacted with the neopentyl glycol to form a first prepolymer, the remaining fraction of the organic diisocyanate is reacted with the organic dihydroxy compound to form a second prepolymer, and the two prepolymers are then reacted with each other in the presence of the remaining neopentyl glycol or dihydric compound.

16. A composition according to claim 2 in which a fraction of the organic diisocyanate is reacted with the neopentyl glycol to form a first prepolymer, the remaining fraction of the organic diisocyanate is reacted with the organic dihydroxy compound to form a second prepolymer, and the two prepolymers are then reacted with each other in the presence of the remaining neopentyl glycol or dihydric compound.

References Cited
UNITED STATES PATENTS

| | | | |
|---|---|---|---|
| 2,899,411 | 8/1959 | Schollenberger | 260—77.5 AP |
| 2,969,386 | 1/1961 | McElroy | 260—77.5 AP |
| 3,412,054 | 11/1968 | Milligan et al. | 260—77.5 AP |
| 3,539,482 | 11/1970 | Stewart | 260—77.5 AM |
| 3,234,184 | 2/1966 | McShane et al. | 260—75 NP |
| 3,015,650 | 1/1962 | Schollenberger | 260—75 NP |

DONALD J. ARNOLD, Primary Examiner

A. H. KOECKERT, Assistant Examiner

U.S. Cl. X.R.

117—138.8 A, 155 R, 161 KP; 161—190; 260—29.1 R, 32.8 N, 77.5 AM, 77.5 AP, 858

UNITED STATES PATENT AND TRADEMARK OFFICE
CERTIFICATE OF CORRECTION

PATENT NO. : 3,726,825
DATED : April 10, 1973
INVENTOR(S) : Fred E. Woodward, Dora A. Krasner and Sherman Krefting It is certified that error appears in the above-identified patent and that said Letters Patent are hereby corrected as shown below:

Column 1, line 17, "or" should be --on--; Column 1, line 18, "reactive" should be --reaction--. Column 2, line 13, "or" should be --on--; Column 2, line 21, after "to" insert --permeable materials. Another object is to--; Column 2, line 28, before "the" insert --that--; Column 2, line 35, after "thermoplastic" insert --polyurethane--. Column 6, line 21, "bactured" should be --factured--; Column 6, line 28, "oragnic" should be --organic--; Column 6, line 43, "mixture" should be --mixtures--. Column 7, line 13, before "410" insert --polyoxypropylene glycols having molecular weights of--; Column 7, line 15, "molecule" should be --molecular--. Column 9, line 56, "compoistions" should be --compositions--. Column 10, line 46, after "films" insert --when--. Column 14, line 31, after "panel" (second occurrence) insert --was--. Column 18, line 56, after "then" insert --resumed and--. Column 19, line 10, "past" should be --paste--; Columns 19 and 20, Table II, Example XI, under the heading "Remarks", "propertis" should be --properties--. Column 22, line 28, "5" should be --.5--; Column 22, line 69, "shown" should be --show--.

Signed and Sealed this

Eleventh Day of January 1977

[SEAL]

Attest:

RUTH C. MASON
Attesting Officer

C. MARSHALL DANN
Commissioner of Patents and Trademarks